United States Patent
Schuster

(10) Patent No.: US 6,945,697 B2
(45) Date of Patent: Sep. 20, 2005

(54) DYNAMIC GAS BEARING OF A MOTOR SPINDLE COMPRISING AERATION

(75) Inventor: Johann Schuster, Nürnberg (DE)

(73) Assignee: Paul Muller GmbH & Co. KG. Unternehmensbeteiligungen, Nuremberg (DE)

(*) Notice: Subject to any disclaimer, the term of this patent is extended or adjusted under 35 U.S.C. 154(b) by 185 days.

(21) Appl. No.: 10/333,576

(22) PCT Filed: Jul. 23, 2001

(86) PCT No.: PCT/DE01/02677

§ 371 (c)(1),
(2), (4) Date: Sep. 2, 2003

(87) PCT Pub. No.: WO02/10598

PCT Pub. Date: Feb. 7, 2002

(65) Prior Publication Data

US 2005/0100254 A1 May 12, 2005

(30) Foreign Application Priority Data

Jul. 27, 2000 (DE) .......................... 100 37 077

(51) Int. Cl.⁷ .............................................. F16C 17/10
(52) U.S. Cl. ...................................... 384/123; 384/121
(58) Field of Search ................................ 384/100, 107, 384/112, 121, 123; 310/90

(56) References Cited

U.S. PATENT DOCUMENTS

| | | | | |
|---|---|---|---|---|
| 5,487,608 A | * | 1/1996 | Leuthold et al. | 384/113 |
| 5,516,212 A | | 5/1996 | Titcomb | |
| 5,795,074 A | | 8/1998 | Rahman et al. | |
| 5,847,479 A | | 12/1998 | Wang et al. | |
| 6,034,454 A | * | 3/2000 | Ichiyama | 384/121 |
| 6,316,857 B1 | * | 11/2001 | Jeong | 310/90 |
| 6,467,963 B2 | * | 10/2002 | Sakuragi et al. | 384/123 |

FOREIGN PATENT DOCUMENTS

EP 0 819 859 1/1998

* cited by examiner

*Primary Examiner*—Thomas R. Hannon
(74) *Attorney, Agent, or Firm*—Collard & Roe, P.C.

(57) ABSTRACT

The invention relates to a dynamic gas mounting of a motor spindle, with a rotating shaft 2 which is gas-mounted in a housing 3 in the radial and axial direction, at least one radial gas bearing 4 being present for radial mounting along the shaft 2 and at least two axial gas bearings 5, 6 being present for the axial mounting of the shaft 2, and the two axial gas bearings 5, 6 having different surface profiles 12 for generating a flow of the bearing gas in the axial direction 14 of the shaft 2 in order to vent the mounting.

15 Claims, 2 Drawing Sheets

DYNAMIC GAS BEARING OF A MOTOR SPINDLE COMPRISING AERATION

CROSS REFERENCE TO RELATED APPLICATIONS

Figure 1:
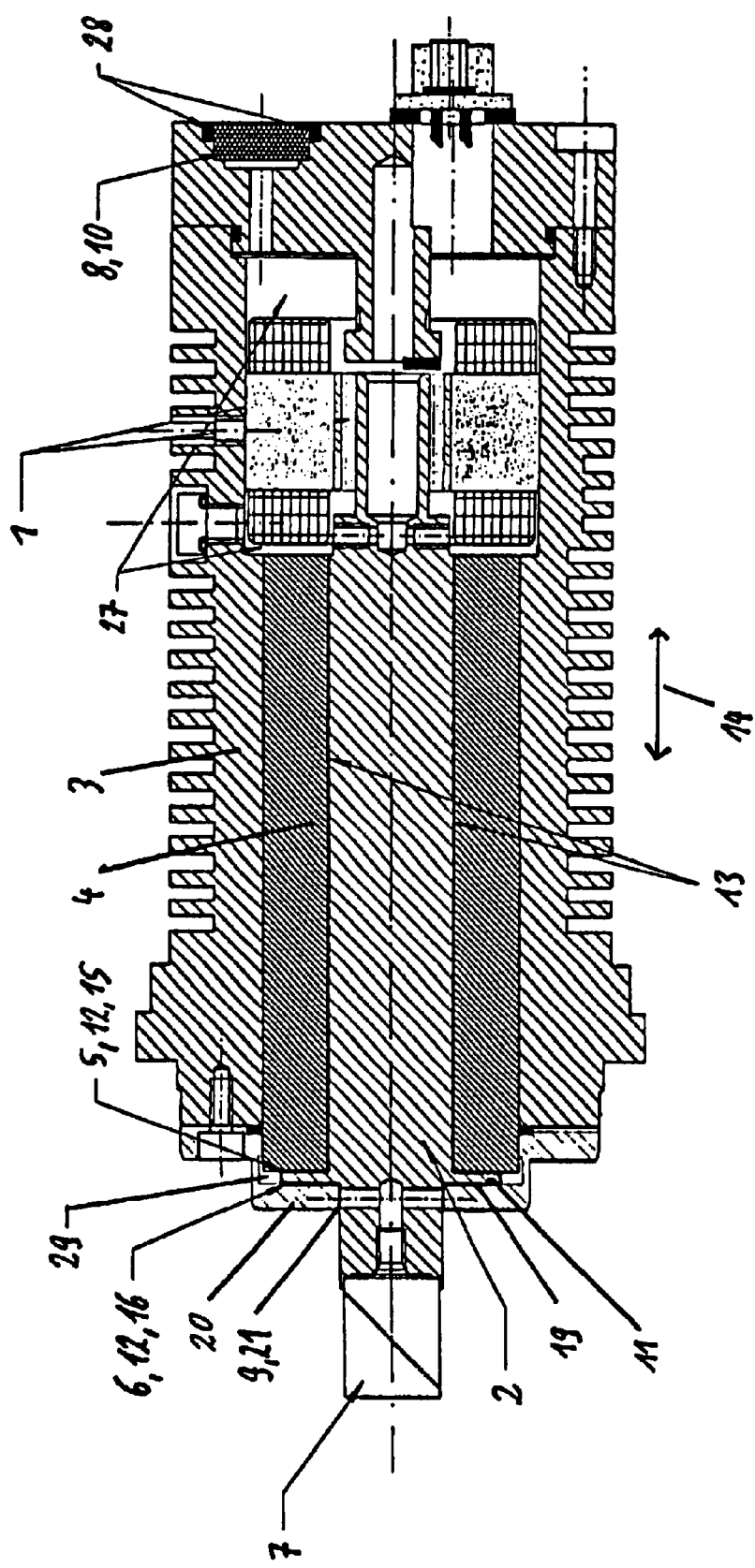

Applicant claims priority under 35 U.S.C. §119 of German Application No. 100 37 077.2 filed Jul. 27, 2000. Applicant also claims priority under 35 U.S.C. §365 PCT/DE01/02677 filed Jul. 23, 2001. The international application under PCT article 21(2) was not published in English.

The invention relates to a dynamic gas mounting of a motor spindle, having the features of the preamble of patent claim 1.

The known prior art includes dynamic gas mountings of motor spindles, in which the air gaps of the radial and axial gas bearings are reduced, at least in regions, over an increasing operating time, particularly on account of abrasion and soiling. As a result, the starting resistance of the dynamic gas mounting is increased and synchronous stability is reduced.

The object on which the invention is based is to offer a dynamic gas mounting of a motor spindle, in which there is no undesirable variation in the running properties of the gas mounting.

This object is achieved by means of the features of the characterizing part of patent claim 1 in conjunction with the features of the preamble. Advantageous embodiments of the invention are described in subclaims 2–15.

In the gas mounting according to the invention, the at least two axial gas bearings possess different surface profiles for generating a flow of the bearing gas in the axial direction of the shaft in order to vent the mounting. A bearing gas flow is consequently generated within the housing of the gas mounting and in the air gap of the radial and axial bearings, with the result that undesirable foreign particles (for example, dirt particles or abrasion) are removed and the mounting is vented and cleaned. Thus, an undesirable variation in the air gap of the gas mounting is avoided and the gas mounting can be operated with a long useful life and high running accuracy, largely maintenance-free, by virtue of continuous gas scavenging as a result of the continuous cleaning which occurs. By "surface profile" is to be meant a surface configuration with elevations/depressions formed in regions, and these may also be generated by means of corresponding coatings. So that the bearing gas, in particular the bearing air, can be sucked in and expelled, the housing of the gas mounting possesses at least two orifices for the introduction and discharge of the flow of bearing gas. Advantageously, at least one orifice is provided with a filter element, in order to avoid soiled ambient air being sucked in.

The dynamic gas mounting according to the invention refers, in particular, to a fast-rotating motor spindle, that is to say a motor spindle in the rotational speed range from about 10,000 revolutions/min to about 200,000 revolutions/min. By "dynamic gas mounting" is to be meant, in contrast to static gas mounting, a self supporting gas mounting without the external supply of bearing gas, in particular of compressed air.

In an advantageous embodiment, the axial gas bearings are designed as spiral-flute axial bearings which carry different spiral-flute profiles as surface profiles. The different spiral-flute profiles produce a pressure difference between the two axial gas bearings when the motor spindle is starting and rotating, so that the desired flow of bearing gas in the axial direction of the shaft is generated. For this purpose, bearing air is sucked in via an inlet orifice of the housing and flows through the housing and, in particular, the air gap of the radial and axial gas bearings, in order thereupon to leave the housing again together with the picked-up foreign particles. Consequently, the interior of the housing and, in particular, the air gap of the gas bearings are kept dirt-free as a result of the cleaning and of the bearing gas flow.

In a particularly advantageous embodiment, the two axial gas bearings may be formed by a shaft shoulder of the shaft, one side of the shaft shoulder forming the first gas bearing and the other side of the shaft shoulder forming the second gas bearing. In this case, a shaft shoulder of this type is provided on one side with a first surface having a first surface profile and on the other side (rear side) with a second surface having a second surface profile. According to the invention, in this case, different surface profiles, that is to say different in terms of their position and/or design, are provided, with the result that, during the operation of the motor spindle, a pressure difference arises between the two surfaces and consequently between the axial gas bearings and the desired bearing gas flow is generated.

According to a further advantageous embodiment, first and second surface profiles formed in annular regions are provided in each case on the first and the second surface of the at least one shaft shoulder. The annular regions may in this case be interrupted or continuous and be arranged on the various surfaces at a different distance from the center point of the shaft. In the case of annular regions arranged between an inner radius $r_i$ and an outer radius $r_a$ of the shaft shoulder, the annular regions may have different outer radii $r_a$ and/or different inner radii $r_i$. The surface profiles arranged in the annular regions thereby acquire a different arrangement, as a result of which, during the interaction of different surface profiles, the desired pressure difference for generating a flow of the bearing gas is induced.

The surface profiles may be designed, for example, as a stepped profile, a partially inward-shaped profile, a partially outward-shaped profile or a herringbone profile. This is explained in more detail in connection with the drawing figures.

Figure 2:
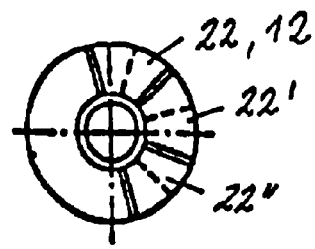
Figure 3:
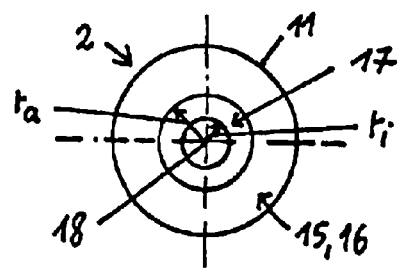
Figure 4:
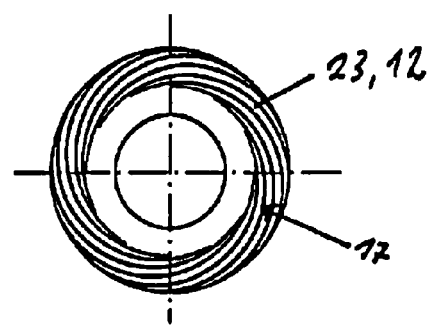
Figure 5:
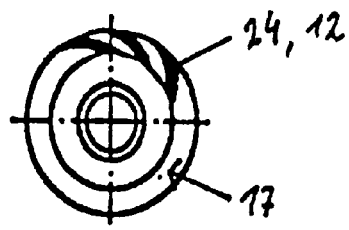
Figure 6:
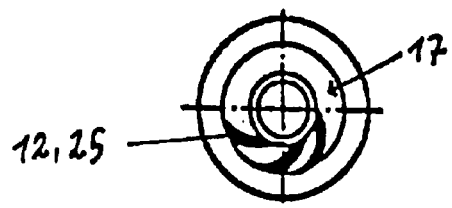
Figure 7:
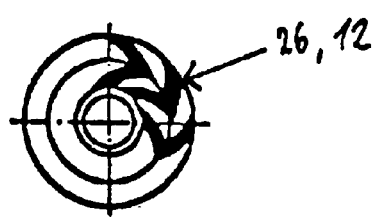

The invention is explained in more detail by means of exemplary embodiments in the drawing figures of which:

FIG. 1 shows a sectional view of a motor spindle with the gas mounting according to the invention, FIG. 2 shows an illustration of a surface profile of an axial gas mounting as a stepped profile, FIG. 3 shows a basic illustration of a shaft shoulder of the shaft with an annular region for forming a surface profile, FIG. 4 shows an illustration of a surface profile of an axial gas bearing as spiral-flute profile, FIG. 5 shows an illustration of a surface profile of an axial gas bearing as a partially inward-shaped profile, FIG. 6 shows an illustration of a surface profile of an axial gas bearing as a partially outward-shaped profile, and FIG. 7 shows the same as a herringbone profile.

FIG. 1 shows a longitudinal section through the housing 3 of a motor spindle with a motor space 27 having a motor 1, for example an electronically commutated DC-motor, for driving the shaft 2, at whose end facing away from the motor 1 is mounted an optical element, for example a mirror element 7 or a polygonal mirror.

The invention relates, in particular, to the dynamic gas mounting of a fast-rotating scanner motor spindle (scanner motor) for digital image projection, for example for the exposure of film-sensitive materials or for projecting an image onto a viewing screen.

The shaft 2 is mounted in the housing 3 in a radial gas bearing 4 and in a first axial gas bearing 5 and a second axial gas bearing 6. The axial mounting is formed by the shaft shoulder 11 of the shaft 2, a first surface 15 having a first surface profile 12 being located on one side of the shaft shoulder 11 and a second surface 16 having a further surface profile 12 being located on the other side (rear side) of the shaft shoulder 11. By a different selection and/or arrangement of the surface profiles 12 on the first and second surfaces 15, 16 of the shaft shoulder 11, when the shaft 2 is in operation a pressure difference arises between the front and the rear side of the shaft shoulder 11, that is to say the first axial gas bearing 5 and the second axial gas bearing 6, with the result that the desired flow of bearing gas in the axial direction 14 of the shaft 2 is generated.

This flow of bearing gas, in particular of bearing air, flushes through the air gap 13 between the shaft 2 and the radial gas bearing 4 and through the air gap 19 on the front and the rear side of the shaft shoulder 11. As a result, the bearing air is sucked in through the orifice 8 having a filter element 10 and a seal 28 and is discharged through the orifice 9 which is designed as a gap 21 between the front cover 20 of the housing 3 and the shaft 2. In this case, for example, disturbing and/or foreign particles present between the radial gas bearing 4 and the shaft 2 are picked up and, after flushing around the shaft shoulder 11, leave the housing 3 of the mounting through the gap 21, during which time, in particular, heavier disturbing and/or foreign particles may also be deposited in the cavity 29.

In the present case, the orifice 8 serves as an inlet orifice for the ambient air and the gap 21 as an outlet orifice for the generated air flow. Depending on the operating state of the motor spindle, a reverse direction of flow may also occur, for example, during run-up or braking. In this respect, an air flow may also occur from the gap 21 to the orifice 8. The gap 21 may in this case also be provided with a filter element (not shown).

Furthermore, particularly when a mirror element 7 is mounted at the end of the shaft 2, an end housing cover of the housing 3 may also be provided in order to encase the mirror element 7. In a casing of this type, an orifice (with a filter element) may also be formed (not shown) for the introduction/discharge of the bearing gas flow. Alternatively, a defined orifice may be provided (likewise not shown) in the cover 20 of the housing 3.

Various possible arrangements of the surface profiles 12, for example on the shaft shoulder 11 of the shaft 2, are explained in the following FIG. 2-7.

FIG. 2 shows an axial gas bearing which has a stepped profile as a surface profile 12, the individual steps 22, 22', 22" being shown by way of example as continuously illustrated steps 22 and being arranged in different planes to one another (for example, rising/falling or wavy).

FIG. 3 shows a basic illustration of an annular region 17 with an inner radius $r_i$ and with an outer radius $r_a$ on a surface 15, 16 of a shaft shoulder 11 of a shaft 2 with a center point 18.

FIG. 4 shows, by way of example, a spiral-flute profile 23 as the surface profile 12 between the inner radius $r_i$ and the outer radius $r_a$ in the annular region 17 which is obtained.

FIG. 5 shows as a surface profile 12 a partially inward-shaped profile 24 which may be arranged continuously or in an interrupted manner in the annular region 17.

FIG. 6 shows a partially outward-shaped profile 25 as the surface profile 12 in an annular region 17 shifted inward with respect to FIG. 5.

In a particularly advantageous embodiment of the gas mounting according to the invention, one surface 15 possesses a surface profile 12 in an outer annular region 17 (for example, a profile according to FIG. 5) and the second surface 16 possesses a surface profile 12 in an inner annular region 17 (for example, a profile according to FIG. 6). In this case, the inner radius $r_i$ of the outer annular region 17 may reach or exceed the outer radius $r_a$ of the inner annular region 17.

FIG. 7 shows, as a surface profile 12, a herringbone profile 26 which is arranged in a sector region or continuously.

By the illustrated or further surface profiles 12 being combined on the surfaces 15, 16 of the shaft shoulder 11 of the shaft 2 of the motor spindle, the sought-after pressure differences between the surfaces 15, 16 can be generated, and consequently the desired bearing gas flow in the axial direction 14 of the shaft 2 can be brought about.

What is claimed is:

1. A dynamic gas mounting of a motor spindle, with a rotating shaft which is gas-mounted in a housing in the radial and the axial direction, at least one radial gas bearing being present for radial mounting along the shaft and at least two axial gas bearings being present for axial mounting, characterized in that the two axial gas bearings (5, 6) have different surface profiles (12) for generating a flow of the bearing gas in the axial direction (14) of the shaft (2) in order to vent the mounting.

2. The dynamic gas mounting as claimed in claim 1, characterized in that the housing (3) has at least two orifices (8, 9) for the introduction and discharge of the flow of bearing gas.

3. The dynamic gas mounting as claimed in claim 2, characterized in that at least one orifice (8, 9) has a filter element (10) for cleaning the introduced or discharged flow of bearing gas.

4. The dynamic gas mounting as claimed in claim 1, characterized in that the two axial gas bearings (5, 6) are designed as spiral-flute axial bearings.

5. The dynamic gas mounting as claimed in claim 1, characterized in that the shaft (2) has at least one shaft shoulder (11) for forming the two axial gas bearings (5, 6).

6. The dynamic gas mounting as claimed in claim 5, characterized in that the shaft shoulder (11) has a first surface (15) with a first surface profile (12) and a second surface (16) with a second surface profile (12).

7. The dynamic gas mounting as claimed in claim 6, characterized in that the first and the second surface profile (12) are formed in annular regions (17) of the first and the second surface (15, 16) respectively.

8. The dynamic gas mounting as claimed in claim 7, characterized in that the annular regions (17) are arranged at a different distance from the center point (18) of the shaft (2).

9. The dynamic gas mounting as claimed in claim 7, characterized in that the annular regions (17) are arranged between an inner radius $r_i$ and an outer radius $r_a$ of the shaft shoulder (11).

10. The dynamic gas mounting as claimed in claim 9, characterized in that the annular regions (17) have different outer radii $r_a$.

11. The dynamic gas mounting as claimed in claim 9, characterized in that the annular regions (17) have different inner radii $r_i$.

12. The dynamic gas mounting as claimed in claim 1, characterized in that at least one surface profile (12) is designed as a stepped profile.

13. The dynamic gas mounting as claimed in claim 1, characterized in that at least one surface profile (12) is designed as a partially inward-shaped profile (24).

14. The dynamic gas mounting as claimed in claim 1, characterized in that at least one surface profile (12) is designed as a partially outward-shaped profile (25).

15. The dynamic gas mounting as claimed in claim 1, characterized in that at least one surface profile (12) is designed as a herringbone profile (26).

* * * * *